(12) United States Patent
Thomason

(10) Patent No.: US 12,058,599 B1
(45) Date of Patent: Aug. 6, 2024

(54) SYSTEMS AND METHODS FOR LOCATING SERVER NODES IN CLOSE PROXIMITY TO EDGE DEVICES USING GEOROUTING

(71) Applicant: EDJX, INC., Raleigh, NC (US)

(72) Inventor: James A. Thomason, Las Vegas, NV (US)

(73) Assignee: EDJX, INC., Raleigh, NC (US)

( * ) Notice: Subject to any disclaimer, the term of this patent is extended or adjusted under 35 U.S.C. 154(b) by 124 days.

(21) Appl. No.: 17/961,304

(22) Filed: Oct. 6, 2022

Related U.S. Application Data

(63) Continuation of application No. 16/831,047, filed on Mar. 26, 2020, now Pat. No. 11,470,535.

(60) Provisional application No. 62/838,666, filed on Apr. 25, 2019.

(51) Int. Cl.
| | |
|---|---|
| H04W 40/20 | (2009.01) |
| G06F 9/54 | (2006.01) |
| H04L 45/00 | (2022.01) |
| H04L 61/4511 | (2022.01) |
| H04L 67/02 | (2022.01) |
| H04L 67/1001 | (2022.01) |
| H04W 84/18 | (2009.01) |
| H04L 101/659 | (2022.01) |

(52) U.S. Cl.
CPC .......... *H04W 40/20* (2013.01); *G06F 9/547* (2013.01); *H04L 45/20* (2013.01); *H04L 61/4511* (2022.05); *H04L 67/02* (2013.01); *H04L 67/1001* (2022.05); *H04W 84/18* (2013.01); *H04L 2101/659* (2022.05)

(58) Field of Classification Search
CPC ... H04W 40/20; H04W 84/18; H04L 61/4511; H04L 67/1001; H04L 45/20; H04L 67/02; H04L 2101/659; G06F 9/547
See application file for complete search history.

(56) References Cited

U.S. PATENT DOCUMENTS

| | | | |
|---|---|---|---|
| 7,032,031 B2 | 4/2006 | Jungck et al. | |
| 8,392,912 B2 | 3/2013 | Davis et al. | |
| 8,539,079 B2 | 9/2013 | Thireault | |
| 8,694,610 B2 | 4/2014 | Jungck | |
| 9,391,856 B2 | 7/2016 | Kazerani et al. | |
| 9,787,560 B2 | 10/2017 | Maddux et al. | |
| 10,805,652 B1 | 10/2020 | Uthaman et al. | |
| 2012/0079115 A1* | 3/2012 | Richardson | H04L 61/4511 709/245 |
| 2013/0103785 A1* | 4/2013 | Lyon | H04N 21/2385 709/217 |
| 2013/0191499 A1 | 7/2013 | Ludin et al. | |
| 2013/0346465 A1 | 12/2013 | Maltz et al. | |
| 2014/0136952 A1* | 5/2014 | Zhu | G06F 16/9574 715/234 |
| 2015/0131499 A1 | 5/2015 | Hall | |

(Continued)

*Primary Examiner* — Christopher M Crutchfield
*Assistant Examiner* — Tito Q Pham
(74) *Attorney, Agent, or Firm* — NEO IP

(57) ABSTRACT

Systems and methods for locating server nodes in close proximity to edge devices using georouting. Microservers automatically form a global peer-to-peer network to serve edge functions and content to edge devices. Edge devices use HyperText Transfer Protocol (HTTP) to execute serverless functions or otherwise retrieve data from edge nodes located in close proximity to the HTTP client. Serverless functions are implemented in secure, isolated environment utilizing a blockchain.

20 Claims, 4 Drawing Sheets

(56) References Cited

U.S. PATENT DOCUMENTS

| | | |
|---|---|---|
| 2015/0143453 A1 | 5/2015 | Erb |
| 2015/0372972 A1* | 12/2015 | Kennedy ............. H04L 61/4511 |
| | | 709/245 |
| 2016/0006836 A1* | 1/2016 | LeFaucheur ............ H04L 67/55 |
| | | 709/203 |
| 2017/0289101 A1* | 10/2017 | Farag ................. H04L 61/4511 |
| 2018/0132015 A1* | 5/2018 | Borrelli ............... G06F 11/3006 |
| 2018/0234351 A1 | 8/2018 | Amento et al. |
| 2018/0241814 A1 | 8/2018 | Kristiansson et al. |
| 2019/0007521 A1 | 1/2019 | Lipstone et al. |
| 2019/0020657 A1 | 1/2019 | Egner et al. |
| 2019/0141015 A1* | 5/2019 | Nellen ................ H04L 63/0272 |
| 2019/0166210 A1* | 5/2019 | Froger ................ H04L 67/1021 |
| 2019/0229900 A1 | 7/2019 | Khristi et al. |
| 2019/0289017 A1* | 9/2019 | Agarwal ............. H04L 9/0643 |
| 2019/0342397 A1* | 11/2019 | Laibson ................ H04L 9/3213 |
| 2019/0387430 A1 | 12/2019 | Ingerman |
| 2020/0177606 A1* | 6/2020 | Valluri ................ H04L 63/1416 |
| 2021/0014575 A1* | 1/2021 | Selfors ................... G09B 19/06 |
| 2021/0120078 A1* | 4/2021 | Wang .................... H04L 67/108 |
| 2022/0006817 A1* | 1/2022 | Ren .................... H04L 61/4511 |

\* cited by examiner

SYSTEMS AND METHODS FOR LOCATING SERVER NODES IN CLOSE PROXIMITY TO EDGE DEVICES USING GEOROUTING

CROSS REFERENCES TO RELATED APPLICATIONS

This application is related to and claims priority from the following U.S. patents and patent applications. This application is a continuation of U.S. patent application Ser. No. 16/831,047, filed Mar. 26, 2020, which claims priority from U.S. Provisional Patent Application No. 62/838,666, filed Apr. 25, 2019. Each of the above listed applications is incorporated herein by reference in its entirety.

BACKGROUND OF THE INVENTION

1. Field of the Invention

The present invention relates to systems and methods for locating server nodes in close proximity to edge devices, and more specifically to georouting of serverless computing and edge computing.

2. Description of the Prior Art

Presently, computer resources within a cloud provider's network are spun up in a cluster (e.g., servers are aggregated in a centralized location, such as a datacenter, etc.). All requests are load-balanced back to that cluster. Unfortunately, such an implementation does not provide the best performance or experience for end users who are located far away from the centralized cluster.

This problem is further compounded by the fact that applications provided within the "cloud" are becoming more robust and require additional resources and computing power, as well as faster response times. Accordingly, the computations being performed over the web are becoming increasingly more intensive. As such, with the centralized cluster approach, many of these computations are being routed away from the user which adds to or even causes delays. This results in a decrease in overall performance and increased latency for users.

Prior art patent documents include the following:

U.S. Pat. No. 8,392,912 for "JAVA APPLICATION FRAMEWORK FOR USE IN A CONTENT DELIVERY NETWORK (CDN)" by inventor Davis, et. al filed Oct. 23, 2006 and issued Mar. 5, 2013, is directed to an application deployment model for enterprise applications to enable applications to be deployed to and executed from a globally distributed computing platform, such as an Internet content delivery network (CDN). According to the publication, application developers separate their Web application into two layers: a highly distributed edge layer and a centralized origin layer. The publication discloses that the edge layer supports a servlet container that executes a Web tier, typically the presentation layer of a given Java-based application. Where necessary, the edge layer communicates with code running on an origin server to respond to a given request. Alternatively, the edge layer supports a more fully-provisioned application server that executes both Web tier (e.g., presentation) and Enterprise tier application (e.g., business logic) components. In either case, the framework enables one or more different applications to be deployed to and executed from the edge server on behalf of one or more respective entities.

U.S. Pat. No. 9,391,856 for "END-TO-END MONITORING AND OPTIMIZATION OF A CONTENT DELIVERY NETWORK USING ANYCAST ROUTING" by inventor Kazerani, et. al filed May 30, 2014 and issued Jul. 12, 2016, is directed to systems and methods to monitor CDN performance from the end user's perspective. To achieve full end-to-end monitoring, the systems and methods monitor the performance of Anycast routing for routing an end user to the optimal PoP of the CDN and monitor the performance of different routes that deliver content from the optimally selected PoP back to the end user. Systems and methods are also provided to leverage the monitored performance in order to automatically optimize the performance of the CDN by optimizing or modifying Anycast routing and by performing route grooming as needed to ensure that the optimal route is selected to deliver content to different sets of end users that request content from a particular PoP.

U.S. Publication No. 2019/0007521 for "BEACON SERVICES IN A CONTENT DELIVERY NETWORK" by Lipstone, et. al filed Aug. 13, 2018 and published Jan. 3, 2019, describes a computer-implemented method in a content delivery network (CDN) comprising multiple content delivery (CD) services including at least one beacon service, the method comprising: at particular CD service in the CDN: (A) obtaining and responding to at least one first request; (B) obtaining and responding to at least one second request; and (C) making a beacon request to a beacon CD service, the beacon request including particular information about: (i) the at least one first request, and (ii) the at least one second request, wherein at least some of the particular information is encoded in the beacon request, wherein the beacon request comprises an HTTP request.

U.S. Pat. No. 8,539,079 for "EDGE-BASED RESOURCE SPIN-UP FOR CLOUD COMPUTING" by inventor Thireault, et. al filed Aug. 10, 2012 and issued Sep. 17, 2013, is directed to distributing new resources closer to end-users which are making increased demands by spinning-up additional virtualized instances (as part of a cloud provisioning) within servers that are physically near to the network equipment (i.e., web servers, switches, routers, load balancers) that are receiving the requests.

U.S. Pat. No. 9,787,560 for "EFFECTIVE SERVICE NODE TRAFFIC ROUTING" by inventor Maddux, et. al filed Jun. 4, 2015 and issued Oct. 10, 2017, describes a traffic routing system to establish a connection with a primary service location, receive a list of service location peers from the primary service location, execute a performance test of the primary service location and each of the service location peers, identify a best performing service location based at least in part on the performance test, and update a database with results of the performance test of the primary service location and each of the service location peers. The traffic routing system may use business rules to expand the criteria to identify the best performing service location. The business rules may include weights that prioritize certain performance characteristics of corresponding service locations including bandwidth cost, energy cost, or idle capacity.

U. S. Publication No. 2018/0241814 for "A SYSTEM, A NODE, A METHOD IN A COMMUNICATION NETWORK AND A COMPUTER PROGRAM AND CORRESPONDING COMPUTER PROGRAM PRODUCT" by inventor Kristiansson, et. al filed Jul. 25, 2017 and published Aug. 23, 2018, is directed to developing scalable and decentralized cloud platforms. This is achieved by introducing a geographical process look-up. Geographical process lookup implies finding a running software process running a runtime environment associated with a geographical location. This process can also be used to find a runtime environment to deploy a new (software) process. The geographical process lookup is accomplished by combining geohash and Kademlia's ability to find nodes that are close to each other and by introducing special software agents, process runtime agents, which are responsible for managing (e.g., deploying/starting) software processes. Geographical process lookup is then achieved according to embodiments by storing references to the process runtime agents in the DHT as key-values, with the key being the agent's geohash string generated from their geographic latitude and longitude coordinates, and the value being other information, e.g., how to connect to the agent.

U.S. Pat. No. 8,694,610 for "APPARATUS AND METHOD FOR DOMAIN NAME RESOLUTION" by inventor Jungck, et. al filed Oct. 26, 2005 and issued Apr. 8, 2014, is directed to an apparatus and method for enhancing the infrastructure of a network such as the Internet. Multiple edge servers and edge caches are provided at the edge of the network so as to cover and monitor all points of presence. The edge servers selectively intercept domain name translation requests generated by downstream clients, coupled to the monitored points of presence, to subscribing Web servers and provide translations which either enhance content delivery services or redirect the requesting client to the edge cache to make its content requests. Further, network traffic monitoring is provided in order to detect malicious or otherwise unauthorized data transmissions.

U.S. Pat. No. 7,032,031 for "EDGE ADAPTER APPARATUS AND METHOD" by inventor Jungck, et. al filed May 15, 2001 and issued Apr. 18, 2006, describes an apparatus and method for enhancing the infrastructure of a network such as the Internet. A packet interceptor/processor apparatus is coupled with the network so as to be able to intercept and process packets flowing over the network. Further, the apparatus provides external connectivity to other devices that wish to intercept packets as well. The apparatus applies one or more rules to the intercepted packets which execute one or more functions on a dynamically specified portion of the packet and take one or more actions with the packets. The apparatus is capable of analyzing any portion of the packet including the header and payload. Actions include releasing the packet unmodified, deleting the packet, modifying the packet, logging/storing information about the packet or forwarding the packet to an external device for subsequent processing. Further, the rules may be dynamically modified by the external devices.

SUMMARY OF THE INVENTION

The present invention provides systems and methods for locating server nodes in close proximity to edge devices using georouting.

In one embodiment, the present invention includes a system for locating server nodes in close proximity to edge devices using georouting, including at least one cloud platform in network communication with at least one edge device, wherein the at least one cloud platform includes a cloud platform domain name system (DNS) service, an edge DNS service, at least one cloud platform application programming interface (API), a cloud platform scheduler, at least one cloud platform router, a cloud platform database, and a cloud platform storage component, wherein the at least one cloud platform is in network communication with a plurality of server nodes, wherein information associated with each of the plurality of server nodes is stored in a node database on the at least one cloud platform, wherein the at least one cloud platform router is operable to access the node database, wherein the at least one cloud platform is operable to receive an initial hypertext transfer protocol (HTTP) request and geolocation data from the at least one edge device, wherein the at least one cloud platform converts the geolocation data to a geohash value, wherein the at least one cloud platform forwards the initial HTTP request to the edge DNS service, wherein the edge DNS service is operable to query the node database for the initial HTTP request using the at least one cloud platform router, wherein the edge DNS service is operable to send a query response to the at least one edge device, wherein the query response includes a nearest server node from the plurality of server nodes, and wherein the nearest server node is operable to execute the initial HTTP request.

In another embodiment, the present invention includes a system for locating server nodes in close proximity to edge devices using georouting, including at least one cloud platform in network communication with at least one edge device, wherein the at least one cloud platform includes a cloud platform domain name system (DNS) service, at least one cloud platform application programming interface (API), a cloud platform scheduler, at least one cloud platform router, a cloud platform database, and a cloud platform storage component, wherein the at least one cloud platform is in network communication with a plurality of server nodes, wherein information associated with each of the plurality of server nodes is stored in a node database on the at least one cloud platform, wherein the at least one cloud platform router is operable to access the node database, wherein the cloud platform DNS service is operable to receive a DNS query from the at least one edge device, wherein the cloud platform DNS service returns an API address corresponding to the DNS query, wherein the at least one cloud platform API is operable to connect to the at least one edge device using the API address, wherein the at least one cloud platform is operable to receive a second query request from the at least one edge device, wherein the second query request includes geolocation data for the at least one edge device, wherein the at least one cloud platform API is operable to receive the second query request, wherein the at least one cloud platform API sends the second query request to the at least one cloud platform router, wherein the at least one cloud platform router is operable to return a nearest server node from the plurality of server nodes to the at least one cloud platform API based on the second query request, wherein the at least one cloud platform API returns a second query response to the at least one edge device using a hypertext transfer protocol (HTTP) redirect, wherein the HTTP redirect includes a unique hostname, and wherein the cloud platform DNS service is operable to resolve the unique hostname.

In yet another embodiment, the present invention includes a method for locating server nodes in close proximity to edge devices using georouting, including at least one cloud platform in network communication with at least one edge device and a plurality of server nodes resolving a hypertext transfer protocol (HTTP) request, wherein the at least one cloud platform includes a cloud platform domain name system (DNS) service, an edge DNS service, at least one cloud platform application programming interface (API), a cloud platform scheduler, at least one cloud platform router, a cloud platform database, and a cloud platform storage component, and wherein resolving the HTTP request includes the at least one cloud platform receiving an initial HTTP request from the at least one edge device, forwarding the initial HTTP request to the cloud platform DNS service, querying the at least one cloud platform router for the nearest node from the plurality of server nodes using the initial HTTP request, connecting the nearest node to the at least one edge device, and resolving the initial HTTP request for the at least one edge device using the nearest node.

These and other aspects of the present invention will become apparent to those skilled in the art after a reading of the following description of the preferred embodiment when considered with the drawings, as they support the claimed invention.

DETAILED DESCRIPTION

Figure 1:
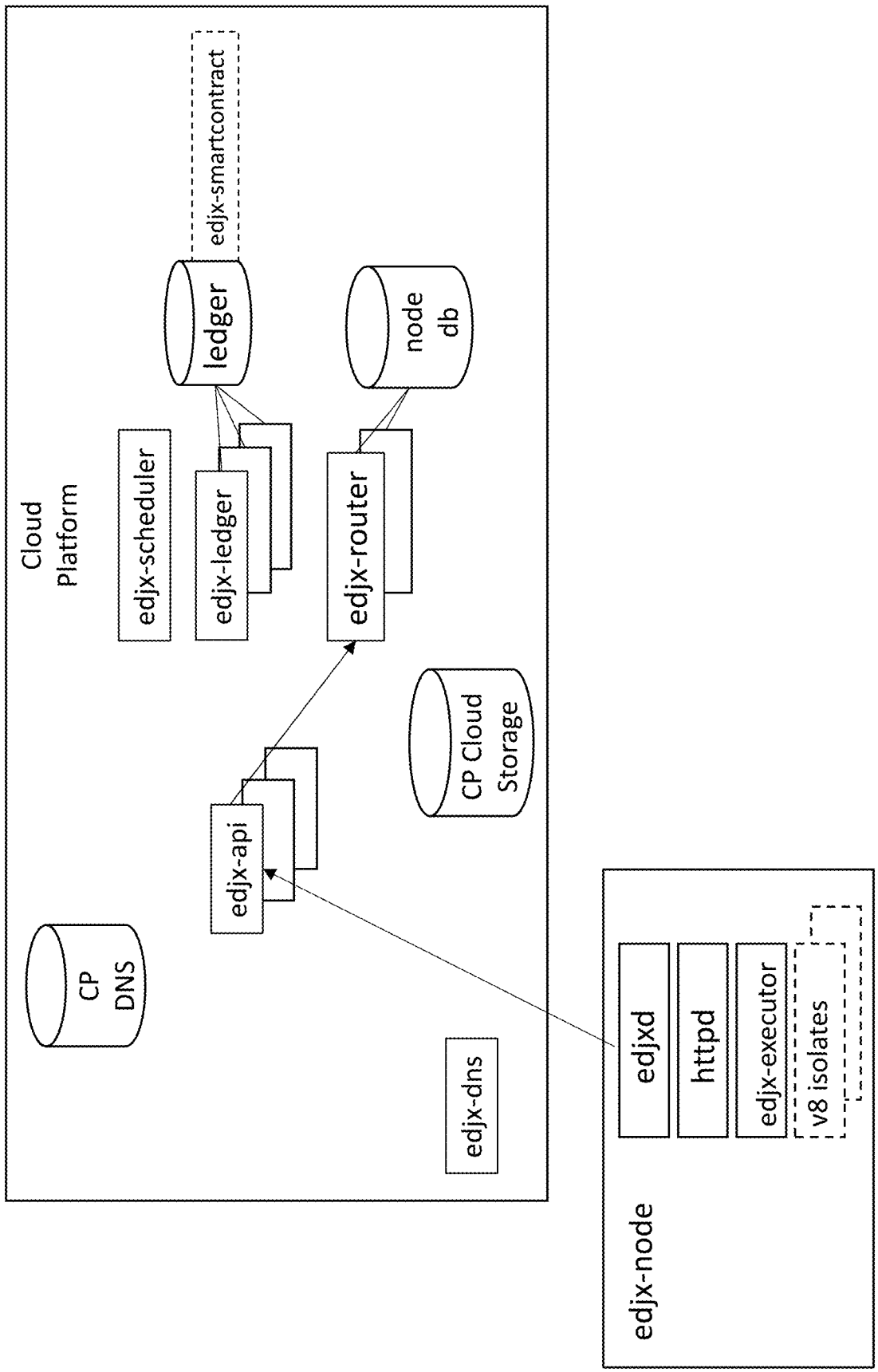
FIG. 1 illustrates a system for locating server nodes in close proximity to edge devices using georouting according to one embodiment of the present invention

The present invention is generally directed to systems and methods for locating server nodes in close proximity to edge devices using georouting.

In one embodiment, the present invention includes a system for locating server nodes in close proximity to edge devices using georouting, including at least one cloud platform in network communication with at least one edge device, wherein the at least one cloud platform includes a cloud platform domain name system (DNS) service, an edge DNS service, at least one cloud platform application programming interface (API), a cloud platform scheduler, at least one cloud platform router, a cloud platform database, and a cloud platform storage component, wherein the at least one cloud platform is in network communication with a plurality of server nodes, wherein information associated with each of the plurality of server nodes is stored in a node database on the at least one cloud platform, wherein the at least one cloud platform router is operable to access the node database, wherein the at least one cloud platform is operable to receive an initial hypertext transfer protocol (HTTP) request and geolocation data from the at least one edge device, wherein the at least one cloud platform converts the geolocation data to a geohash value, wherein the at least one cloud platform forwards the initial HTTP request to the edge DNS service, wherein the edge DNS service is operable to query the node database for the initial HTTP request using the at least one cloud platform router, wherein the edge DNS service is operable to send a query response to the at least one edge device, wherein the query response includes a nearest server node from the plurality of server nodes, and wherein the nearest server node is operable to execute the initial HTTP request. In one embodiment, the cloud platform DNS service uses a wildcard match function when forwarding the initial HTTP request to the edge DNS service. In one embodiment, wherein the nearest server node includes a time-to-live (TTL) value, wherein the nearest server node TTL value is less than one minute or equal to one minute. In one embodiment, each of the plurality of server nodes contains a current node Internet Protocol (IP) address, a node executor, a plurality of v8 isolates, a HTTP server program, a current geographic location, a node heartbeat, a node version, a node uptime, a node identifier (ID), a node time zone, and/or node central processing unit (CPU) data. In another embodiment, each of the plurality of server nodes is registered with a cloud platform global registry of the at least one cloud platform, wherein each of the plurality of server nodes is registered by issuing a HTTP POST request to a global service address corresponding to the at least one cloud platform. In another embodiment, each of the plurality of server nodes includes a globally unique identifier (GUID) that is generated when each of the plurality of server nodes is first powered on. In yet another embodiment, the at least one cloud platform API is a Representational State Transfer (REST) interface. In yet another embodiment, the geolocation data from the at least one edge device is a set of Global Positioning System (GPS) coordinates.

In another embodiment, the present invention includes a system for locating server nodes in close proximity to edge devices using georouting, including at least one cloud platform in network communication with at least one edge device, wherein the at least one cloud platform includes a cloud platform domain name system (DNS) service, at least one cloud platform application programming interface (API), a cloud platform scheduler, at least one cloud platform router, a cloud platform database, and a cloud platform storage component, wherein the at least one cloud platform is in network communication with a plurality of server nodes, wherein information associated with each of the plurality of server nodes is stored in a node database on the at least one cloud platform, wherein the at least one cloud platform router is operable to access the node database, wherein the cloud platform DNS service is operable to receive a DNS query from the at least one edge device, wherein the cloud platform DNS service returns an API address corresponding to the DNS query, wherein the at least one cloud platform API is operable to connect to the at least one edge device using the API address, wherein the at least one cloud platform is operable to receive a second query request from the at least one edge device, wherein the second query request includes geolocation data for the at least one edge device, wherein the at least one cloud platform API is operable to receive the second query request, wherein the at least one cloud platform API sends the second query request to the at least one cloud platform router, wherein the at least one cloud platform router is operable to return a nearest server node from the plurality of server nodes to the at least one cloud platform API based on the second query request, wherein the at least one cloud platform API returns a second query response to the at least one edge device using a hypertext transfer protocol (HTTP) redirect, wherein the HTTP redirect includes a unique hostname, and wherein the cloud platform DNS service is operable to resolve the unique hostname. In one embodiment, the unique hostname is a combination of a node identifier (ID) associated with the nearest node and an application ID, wherein the application ID is received in the DNS query. In one embodiment, wherein the cloud platform DNS service resolves the unique hostname using a current Internet Protocol (IP) address received from the at least one edge device. In another embodiment, wherein the HTTP redirect includes a HTTP 307 Temporary redirect. In another embodiment, wherein the geolocation data is appended to the second query request as a query parameter for a Uniform Resource Identifier (URI). In yet another embodiment, wherein the at least one cloud platform further includes a cloud platform ledger, wherein the cloud platform ledger is operable to interact with at least one cloud platform smart contract.

In yet another embodiment, the present invention includes a method for locating server nodes in close proximity to edge devices using georouting, including at least one cloud platform in network communication with at least one edge device and a plurality of server nodes resolving a hypertext transfer protocol (HTTP) request, wherein the at least one cloud platform includes a cloud platform domain name system (DNS) service, an edge DNS service, at least one cloud platform application programming interface (API), a cloud platform scheduler, at least one cloud platform router, a cloud platform database, and a cloud platform storage component, and wherein resolving the HTTP request includes the at least one cloud platform receiving an initial HTTP request from the at least one edge device, forwarding the initial HTTP request to the cloud platform DNS service, querying the at least one cloud platform router for the nearest node from the plurality of server nodes using the initial HTTP request, connecting the nearest node to the at least one edge device, and resolving the initial HTTP request for the at least one edge device using the nearest node. In one embodiment, each of the plurality of server nodes includes an Internet Protocol version 6 (IPv6) address, a node ID, a cloud platform executor, and a plurality of v8 isolates. In one embodiment, querying the at least one cloud platform router is initiated by the edge DNS service. In another embodiment, querying the at least one cloud platform router is initiated by the at least one cloud platform API. In another embodiment, resolving the initial HTTP request for the at least one edge device is performed using a HTTP redirect. In yet another embodiment, resolving the initial HTTP request for the at least one edge device is performed using a HTTP server program corresponding to the nearest node.

With smart sensors and Internet of Things (IoT) devices gaining popularity and collecting vast amounts of data, centralized cloud systems are facing challenges to better manage and handle all edge devices and their data. For example, according to a report from Research And Markets "Global Edge Computing Market-Forecasts from 2018 to 2023" and a report from Grandview Research "Edge Computing market worth $3.24 Billion By 2025|CAGR: 41.0%," devices connecting people and things will grow 3 times between 2019 and 2025 to over 75 billion, data generated at the edge will explode 5 times from 520 zettabytes in 2019 to over 2500 zettabytes by 2024, and there will be a massive 64-zettabyte shortfall in bandwidth to the cloud by 2021 as computing moves into the real world. It is costly to build data centers to store and process the huge amount of data from connected devices. There is a gap between IoT devices and cloud networks which causes larger latency and limits storage capacity. Edge computing, as a new computing paradigm, pushes applications, data, and computing power away from centralized servers to the edge of the network. Edge computing is a distributed computing model in which computations are largely preformed on distributed edge devices as opposed to primarily taking place in a centralized cloud environment.

Prior art makes use of anycast routing techniques, where multiple servers announce the same Internet Protocol (IP) address. When a computer or device connects to such an address, it will be automatically routed to the server with the closest logical path. The downside of anycast routing is that an anycast system is not aware of actual physical distance and, instead, focuses on the shortest logical path. This requires constant maintenance to ensure the correct routes are being chosen, resulting in increased costs and a much greater time commitment to keep the system optimal.

Georouting is a routing principle that relies on geographic position information. It is mainly utilized in wireless networks and is based on the idea that the source sends a message to the geographic location of the destination instead of using the network address. Georouting requires that each node has the ability to determine its own location and that the source is aware of the location of the destination. With this information, a message is operable to be routed to the destination without knowledge of the network topology or a prior route discovery.

Geohashing is a public domain geocoding system invented by Gustavo Niemeyer, which encodes a geographic location into a short string of letters and digits. It is a hierarchical data structure which subdivides space into buckets of grid space, which is one of the many applications of what is known as Z-order curve, and generally space-filling curves.

Geohashes offer arbitrary precision and the possibility of gradually removing characters from the end of the code to reduce its size. As a consequence of the gradual precision degradation, nearby places will often present similar prefixes. The longer the shared prefix is, the closer the two places are.

The main usage of geohashes revolves around their ability to serve as unique identifiers or represent point data, e.g. in databases. When used in a database, the structure of geohashed data has two advantages. First, data indexed by geohash will have all points for a given rectangular area in contiguous slices (the number of slices depends on the precision required and the presence of geohash "fault lines"). This is especially useful in database systems where queries on a single index are much easier or faster than multiple-index queries. Second, this index structure is operable to be used for quick-and-dirty proximity search: the closest points are often among the closest geohashes.

None of the prior art discloses validating and recording each HTTP request to a blockchain to create an immutable record of execution.

The present invention utilizes a globally distributed edge computing platform (sometimes referred to as "EDJX") to reduce latency and increase network throughput to HTTP clients (edge devices) by locating server nodes in close proximity to edge devices. The edge platform of the present invention enables users to write, test, and deploy low-latency edge applications. Users of this edge platform execute serverless functions or otherwise retrieve data from the platform compute nodes located in close proximity to the client. As security is a big concern for edge use cases, each serverless request is validated by and recorded to a blockchain to create an immutable record of execution. The edge platform is Application Programming Interface (API) compatible with cloud infrastructures including, but not limited to, GOOGLE CLOUD PLATFORM, AMAZON WEB SERVICES (AWS), and MICROSOFT AZURE.

An edge device is any device which provides an entry point into enterprise or service provider core networks. Examples include, but are not limited to, routers, routing switches, integrated access devices (IADs), multiplexers, metropolitan area network (MAN) access devices, wide area network (WAN) access devices, IoT devices, sensors, industrial machines, personal computing devices, laptop computing devices, tablet computing devices, mobile computing devices, and any other device that produces and/or collects data.

Advantageously, serverless computing removes the need to pay for pre-defined computing capacity and storage in cloud computing, as businesses only pay for the resources consumed by their applications. Serverless computing improves the functionality and the development process of all types of applications overall.

A key aspect of serverless computing is functions. Functions are small, independent pieces of code that complete specific requests, providing developers with more operational flexibility and cost savings when building, deploying, and running applications. The management and deployment of functions is referred to as function-as-a-service (FaaS), which is synonymous with serverless computing.

The edge platform overcomes current issues in the prior art, including latency and bandwidth limitations at the edge, by deploying serverless functions in close proximity to edge devices. The edge platform further enables edge devices to securely access and record data at the edge using blockchain technologies.

Edge Platform Nodes (EDJX-Node):

Nodes in the edge platform network are computing systems that run the edge platform software stack. In one embodiment, the edge platform software stack comprises a client tier, a web tier, a business tier and a database tier. In another embodiment, the edge platform software stack comprises a custom HTTP process, a query layer, an HTTP endpoint operable to interact with serverless functions, and a runtime environment. In one embodiment, the runtime environment uses an event-driven architecture operable for asynchronous Input/Output (I/O). In one embodiment, the runtime environment is Node.js. In another embodiment, the runtime environment is operable to execute code outside of a browser. In yet another embodiment, the edge platform software stack is a full stack. In yet another embodiment, the edge platform software stack is a LAMP variation stack. A LAMP stack includes a Linux operating system, an Apache Web server, a MySQL database and a PHP application software. In one embodiment, the edge platform software stack is a LAPP stack, which is a PostgreSQL database variation optimized for enterprise-level projects. In yet another embodiment, the edge platform software stack is a MEAN stack. A MEAN stack includes a MongoDB database (JSON-powered NoSQL database), the AngularJS front-end framework, Express.js (a web framework for Node.js), and a base platform of the Node.js runtime.

Nodes are identified by a globally unique identifier (GUID) that is generated the first time a node is powered on. In one embodiment, the GUID follows the structure defined in RFC-4122, where the GUID is a 128-bit unique reference number. In one embodiment, the GUID is generated using both the current time and a client Media Access Control (MAC) address. In another embodiment, the GUID is generated by taking a namespace (e.g., a fully qualified domain name) and a given name, converting to bytes, concatenating, and hashing, where the resulting bytes are converted into hexadecimal form. In another embodiment, the GUID is generated using random numbers, where 6 of the 128 bits are reserved for version and variant bits and 122 bits are filled at random.

Edge platform nodes are responsible for serving HTTP requests from designated edge devices. Edge platform nodes themselves are HTTP clients of the edge platform.

Each node in the edge platform network includes at least one v8 isolate. Isolates are lightweight contexts which group variables where code is allowed to mutate/change them. A single process is operable to run hundreds or thousands of isolates and seamlessly switch between them. Isolates make it possible to run code from many different devices within a single operating-system process. In one embodiment, each node in the edge platform includes a plurality of v8 isolates.

Node Registry and Router (EDJX-Router):

The edge platform nodes periodically contact a centralized registry component (sometimes referred to as the "EDJX-router"). This edge platform router is a distributed application that provides an interface for registering information about the edge platform nodes.

In one embodiment, the interface used is a Representational State Transfer (REST) interface. REST is an architectural style for distributed hypermedia systems. In the REST architectural style, the implementation of the client and the implementation of the server is operable to be done independently without each knowing about the other. This means that code on the client side is operable to be changed at any time without affecting the operation of the server, and the code on the server is operable to be changed without affecting the operation of the client. As long as each side knows what format of messages to send to the other, each side is operable to be kept modular and separate. Separating the user interface concerns from the data storage concerns improves the flexibility of the interface across platforms and improves scalability by simplifying the server components. By using a REST interface, different clients hit the same REST endpoints, perform the same actions, and receive the same responses.

Alternatively, the interface used for registering information about the edge platform nodes is another architectural style for distributed hypermedia systems, including, but not limited to, a GRAPHQL interface, a Falcor interface, or a Simple Object Access Protocol (SOAP) interface.

Node registrations, heartbeats, and other activities are conducted by a daemon on each node (sometimes referred to as an "EDJX node"). The node process periodically collects system information and posts it to the edge platform API to be included among the nodes collection maintained by an edge platform router. The collected system information includes, but is not limited to, static information such as hardware data, baseboard data, bios data, OS, version data, Central Processing Unit (CPU) data, network interface data, memory, and disk layout, as well as dynamic data such as user data, CPU-speed, load data, processes, services, temperature, file system data, network data, and disk statistics.

Nodes register themselves in the edge platform's global registry by issuing a HTTP POST request to a global service address. The hostname resolves to a set of load balanced instances of the edge platform's API component. The edge platform's API component authenticates the API and proxies the request to the edge platform router service, which persists the node data.

The HTTP POST request contains node information including, but not limited to, a GUID, a latitude, a longitude, a zip code, a street address, CPU information, a version number, an uptime, a time zone, and an Internet Protocol (IP) address. In one embodiment the IP address is an IPv6 address. In another embodiment, the IP address is an IP version beyond IPv6.

The act of first-time node registration and subsequent node updates are not differentiated. Rather, the posting of a node to the nodes collection is a destructive update, and the update time is treated as a node heartbeat. A node heartbeat is a signal that is generated at regular intervals to indicate that the node is working correctly. If a node heartbeat is not sent, the node is considered to be unreachable.

Regarding node heartbeats, there are two main values: a heartbeat interval and a heartbeat timeout. The heartbeat interval refers to an interval where a request is sent to a node at a set time interval, where the node responds to the request directly. If there is no response from the node, the request determines that the node is inactive. Heartbeat timeout refers to the time interval since the last heartbeat was received by the node. This heartbeat timeout value is greater than the heartbeat interval value. If a node has not received a response from the request in the time specified by the heartbeat timeout value, the node assumes the request has ended.

Nodes must send heartbeats to avoid the undesirable effect of accidently routing an HTTP request to a node that is no longer available. Popular HTTP load-balancer systems, such as F5, often set this interval at a period of 5 seconds with a 16 second heartbeat timeout.

Load balancers are devices that act as reverse proxies and distribute network or application traffic across a number of servers. Load balancers are used to increase capacity (concurrent users) and reliability of applications. They improve overall performance of applications by decreasing the burden on servers associated with managing and maintaining application and network sessions, as well as performing application-specific tasks.

Regardless of the interval selected, nodes should use a random time splay to avoid a distributed-systems-style top of the minute problem. A top of the minute problem arises when all devices use the same clock and all devices attempt to send data at the top of the minute, resulting in a server performing a substantial amount of CPU work for several seconds of each minute and nothing for the rest.

Node Database and Geolocation:

The edge platform router persists the node data to a table within a cloud platform database called an edge platform node database.

In one embodiment, the edge platform node database is an object-relational database system. An object-relational database system is a database system that is similar to a relational database, except that it has an object-oriented database model. This system supports objects, classes and inheritance in database schemas and query language.

In one embodiment, the edge platform node database is a PostgreSQL database. PostgreSQL is an open source, object-relational database system and is capable of running on all major operating systems. The edge platform node database is operable to be queried and return a list and/or set of nodes.

In one embodiment, the edge platform node database instance is extended by a PostGIS extension for geographic objects. PostGIS is a database extension for an object-relational database. It adds support for geographic objects allowing location queries to be run in SQL.

According to one embodiment of the present invention, geolocation of an edge device is determined using a Global Positioning System (GPS).

In another embodiment, the geolocation of an edge device is determined based on a Cell ID, where the edge device is a smart phone, a cellular telephone, or any other device capable of communication with a cell tower. A Cell ID determines which sector of which base station a given edge device is using and, using a database of base-station identification numbers and locations, an edge device's location is associated with that of the identified cell tower.

In another embodiment, the geolocation of an edge device is determined based on WI-FI. Geolocation based on WI-FI makes use of received signal strength indication (RSSI), where signals detected by an edge device from nearby access points refer to a database of WI-FI networks. The database is operable to store location information for each uniquely identified access point. Using signal strength to determine distance, RSSI determines where an edge device is located in relation to known access points. In yet another embodiment, another form of WI-FI geolocation is used, wireless fingerprinting. Wireless fingerprinting uses profiles of given places that are based on the pattern of WI-FI signals located there. The fingerprint is created and stored in a database.

In another embodiment, the geolocation of an edge device is determined based on inertial sensors. Inertial sensors keep track of an edge device's location using a combination of inputs including, but not limited to, a compass/magnetometer and an accelerometer.

In another embodiment, the geolocation of an edge device is determined based on a barometer. While outdoor navigation typically occurs on one level, either going straight or turning, elevation is a concern when navigating indoors. Since altitude is closely related to air pressure, the use of a barometer provides an accurate means of location.

In another embodiment, the geolocation of an edge device is determined based on ultrasonic technologies, such as radio-frequency identification (RFID) or near-field communications (NFC).

In another embodiment, the geolocation of an edge device is determined based on BLUETOOTH beacons. BLUETOOTH beacons are placed every few meters and are operable to communicate with any edge device equipped with BLUETOOTH version 4.0 (the newest version of the standard) or greater.

In yet another embodiment, the geolocation of an edge device is determined based on terrestrial transmitters. Terrestrial transmitters are location transmitters that use the same principle as GPS, but are mounted on buildings and cell towers. Since the terrestrial transmitters are stationary and provide a much stronger signal to receivers than satellites do from space, the terrestrial transmitters are operable to pinpoint an edge device's location near-instantaneously.

In another embodiment, an edge device's geolocation is determined using Hyper Text Markup Language 5 (HTML5). HTML5 is the next major revision of the HTML standard superseding HTML 4.01, XHTML 1.0, and XHTML 1.1. HTML5 is a standard for structuring and presenting content on the World Wide Web. In another embodiment, an edge device's geolocation is determined using an HTML version beyond HTML5.

In another embodiment, an edge device's geolocation is determined using a combination of at least two of the previously mentioned geolocation techniques.

In one embodiment, the present invention provides systems and methods for locating server nodes in close proximity to edge devices using georouting in a distributed edge computing platform.

In one embodiment, the georouting of the present invention is Domain Name System (DNS) based.

In another embodiment, the georouting of the present invention is HTTP-redirect-based. HTTP clients are directed to the nearest edge platform node transparently through the use of HTTP-redirects.

In one embodiment, microservers (sometimes referred to as "EdjPods") automatically form a global peer-to-peer (P2P) network to serve edge functions and content to mobile users and IoT devices. HTTP requests are redirected to the closest EdjPod where serverless functions are executed in a secure, isolated environment. In another embodiment, the serverless functions are executed in a secure, isolated environment using a blockchain.

Nearest Edge Platform Node

In one embodiment, a nearest edge platform node is located using Johnson's All Pairs Shortest Path Algorithm. In another embodiment, Floyd-Warshall's All Pairs Shortest Path algorithm is used. Alternatively, the nearest edge platform node is solved using another algorithm, for example, but not limited to, Shortest Path A*, Bi-Directional Dijkstra Shortest Path, Bi-Directional A* Shortest Path, Shortest Path Dijkstra, Driving Distance, K-Shortest Path (Multiple Alternative Paths), K-Dijkstra (One to Many Shortest Path), Traveling Sales Person, and Turn Restriction Shortest Path (TSRP).

In another embodiment, machine learning (ML) and/or artificial intelligence (AI) is used when locating server nodes in close proximity to edge devices using georouting. In this embodiment, a ML algorithm is operable to interact with a trained geolocation model to estimate the geolocation of an edge device. Different types of data relating to a user's edge device is processed by a ML algorithm depending on whether the user is indoors or outdoors. For example, if a user's edge device is outdoors, characteristics such as, but not limited to, time of day and signal strength and/or signal quality if the edge device receives a telecommunication signal. ML algorithms using a trained geolocation model are operable to determine the geolocation of each edge device based on input data associated with each edge device. A ML algorithm uses the geolocation model to analyze data inputs from an edge device to generate a preliminary geolocation of the edge device. Preferably, the analytics and edge device inputs used by ML algorithms in connection with the present invention for geolocation modeling and ML-based location estimation, such as those taught by U.S. Publication No. 2016/0021503, U.S. Publication No. 2013/0086072, U.S. Publication No. 2019/0007365, U.S. Publication No. 2018/0324477, and U.S. Pat. No. 8,190,627, each of which is incorporated herein by reference in its entirety.

Referring now to the drawings in general, the illustrations are for the purpose of describing one or more preferred embodiments of the invention and are not intended to limit the invention thereto.

FIG. 1 illustrates a georouting system according to one embodiment of the present invention.

In one embodiment, a georouting system includes at least one edge device, at least one edge platform node, and at least one cloud platform. The at least one edge device is operable to store location information and contains a HTTP client. The at least one cloud platform includes a cloud platform DNS, an edge platform DNS, a plurality of edge platform APIs, an edge platform scheduler, a ledger containing a plurality of edge platform ledgers and operable to interact with edge platform smart contracts, a node database containing a plurality of edge platform routers, and a storage component for the cloud platform. The at least one edge platform node contains a current IP address, an edge platform executor, a plurality of v8 isolates, and at least one HTTP server program. The HTTP client of the at least one edge device is operable to communicate with both the cloud platform DNS and the edge platform DNS, where the edge platform DNS is in network communication with the plurality of edge platform routers in the node database.

In another embodiment, a georouting system includes a plurality of edge devices, a plurality of edge platform nodes, and at least one cloud platform. The plurality of edge devices is operable to store location information and a HTTP client. The at least one cloud platform includes a cloud platform DNS, an edge platform DNS, a plurality of edge platform APIs, at least one edge platform scheduler, a ledger containing a plurality of edge platform ledgers operable to interact with at least one edge platform smart contract, at least one node database containing a plurality of edge platform routers, and a storage component for the cloud platform. The plurality of edge platform nodes store information relating to, but not limited to, an IP address, an edge platform executor, a plurality of v8 isolates, and at least one HTTP server program. The HTTP client of each of the plurality of edge devices is in network communication with the cloud platform DNS and the edge platform DNS, where the edge platform DNS is in network communication with a plurality of edge platform routers in the at least one node database. In one embodiment, the at least one cloud platform is public. In another embodiment, the at least one cloud platform is private. In another embodiment, the location information of the plurality of edge devices is real-time or near real-time location information.

In another embodiment, at least one edge device is in network communication with at least one cloud platform. The at least one edge device is operable to store location information and at least one HTTP client. The at least one cloud platform includes a cloud platform DNS, an edge platform DNS, a plurality of edge platform APIs in communication with a plurality of edge platform routers where the plurality of edge platform routers are stored in a cloud platform node database, an edge platform scheduler, a plurality of edge platform ledgers stored in at least one cloud platform ledger, and at least one cloud platform storage component. The at least one cloud platform ledger is operable to interact with edge platform smart contracts. The at least one edge device is in network communication with a plurality of edge platform nodes. The plurality of edge platform nodes each contain an IP address, a node ID, an edge platform executor, and a plurality of v8 isolates. The plurality of edge platform nodes is operable to receive an HTTP request from the at least one edge device. In one embodiment, the IP address is an IPv6 address. In another embodiment, the IP address is a future IP version beyond IPv6.

Figure 2:
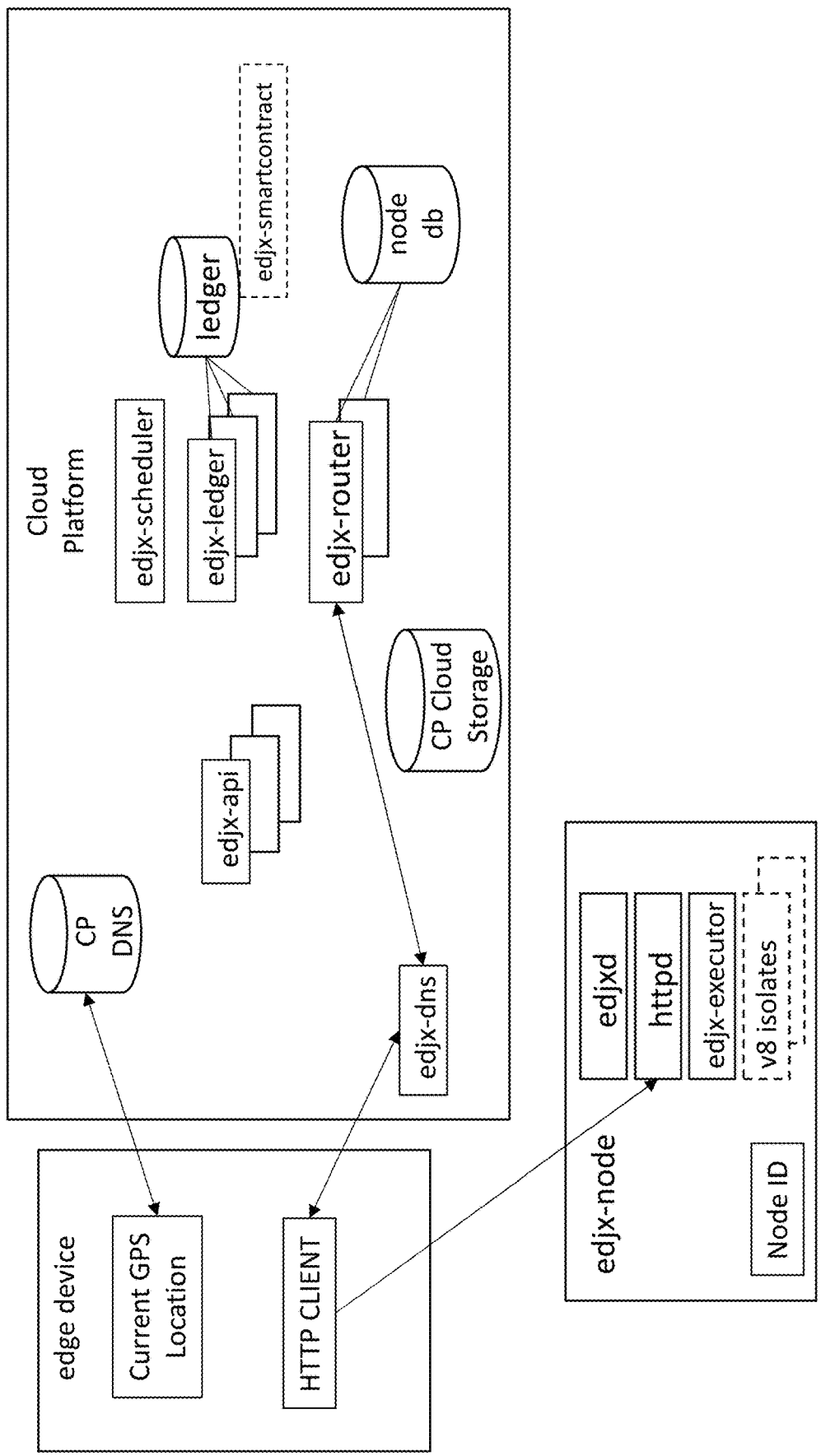
FIG. 2 illustrates a system for DNS-based georouting according to one embodiment of the present invention.

FIG. 2 illustrates a system for DNS-based georouting according to one embodiment of the present invention.

In one embodiment, at least one edge device converts its location data to a geohash, where the geohash is appended to a hostname, resulting in a geohashed hostname, and the at least one edge device sends an initial HTTP request to at least one cloud platform. The at least one cloud platform DNS forwards the HTTP request from the at least one edge device to an edge platform DNS. The at least one edge device queries the edge platform DNS for the geohashed hostname. The edge platform DNS queries an edge platform node service, locating the nearest edge platform node to the at least one edge platform device. The edge platform DNS returns the nearest edge platform node with a pre-determined Time-to-Live (TTL). The at least one edge device issues the HTTP request to the nearest edge platform node.

The TTL for an edge platform node refers to a value that specifies the number of seconds until the edge platform node expires. For example, when an edge device sends an HTTP request to an expired edge platform node, it is treated as though the edge platform node is not available.

Figure 3:
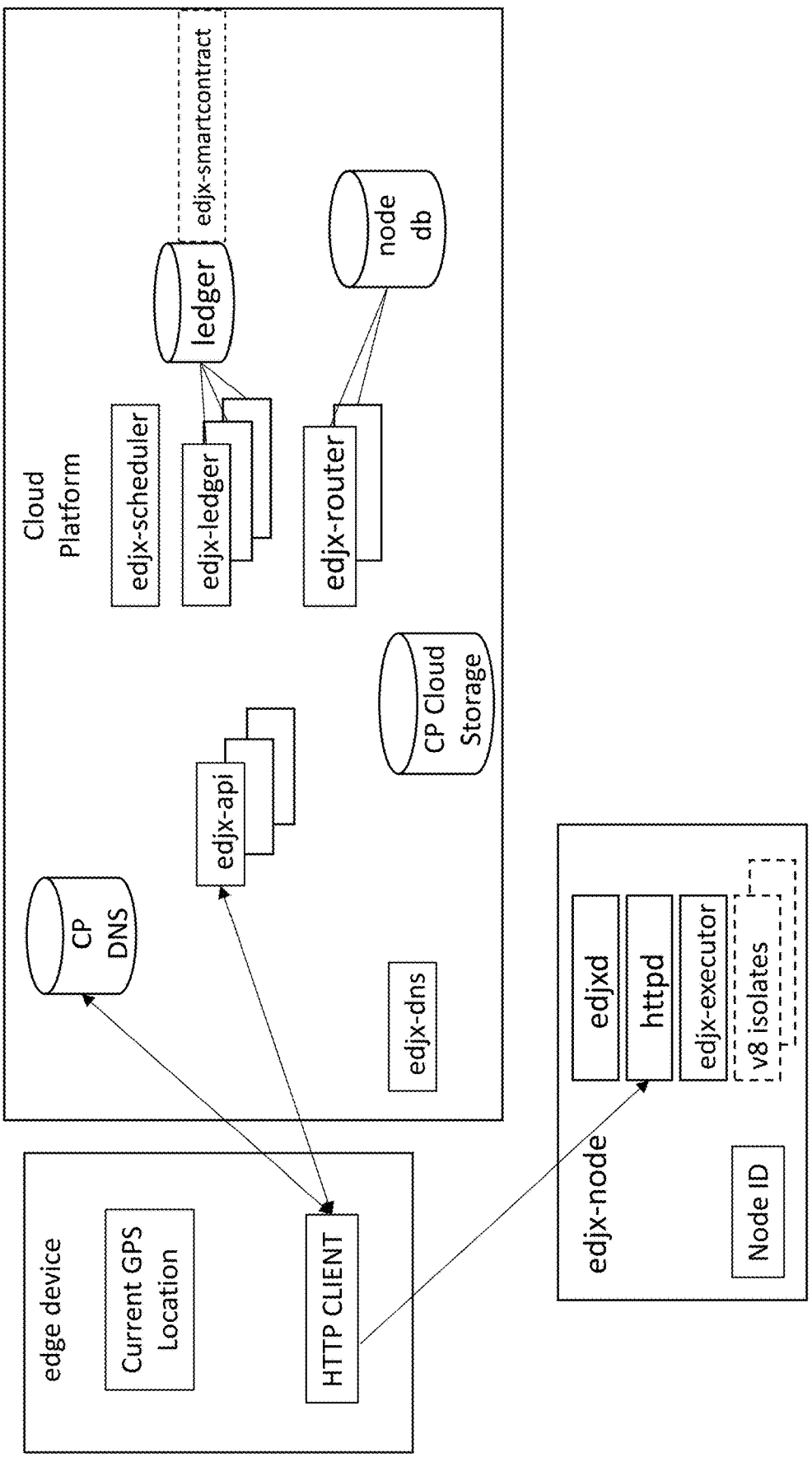
FIG. 3 illustrates a system for HTTP-redirect-based georouting according to one embodiment of the present invention.

FIG. 3 illustrates a system for HTTP-redirect-based georouting according to one embodiment of the present invention.

In another embodiment, at least one edge device is directed to at least one nearest edge platform node through the use of HTTP-redirects. The at least one edge device resolves a hostname by querying a root DNS for an edge platform domain name. The root DNS returns the address of at least one of a plurality of edge platform APIs. The at least one edge device is in network communication with the at least one of a plurality of edge platform APIs and issues a request for the hostname, where the at least one edge device's current location has been appended as query parameters to the Uniform Resource Identifier (URI). The at least one of a plurality of edge platform APIs queries at least one of a plurality of edge platform routers, solving for the nearest edge platform node and issuing a redirect to the at least one edge device for a hostname. The hostname is an edge platform node ID (nodeID) appended to an application ID (appID). The at least one edge device issues a request to the hostname by resolving it to the current IP address of at least one edge platform node, where an edge platform DNS resolves the edge platform node's hostname.

Figure 4:
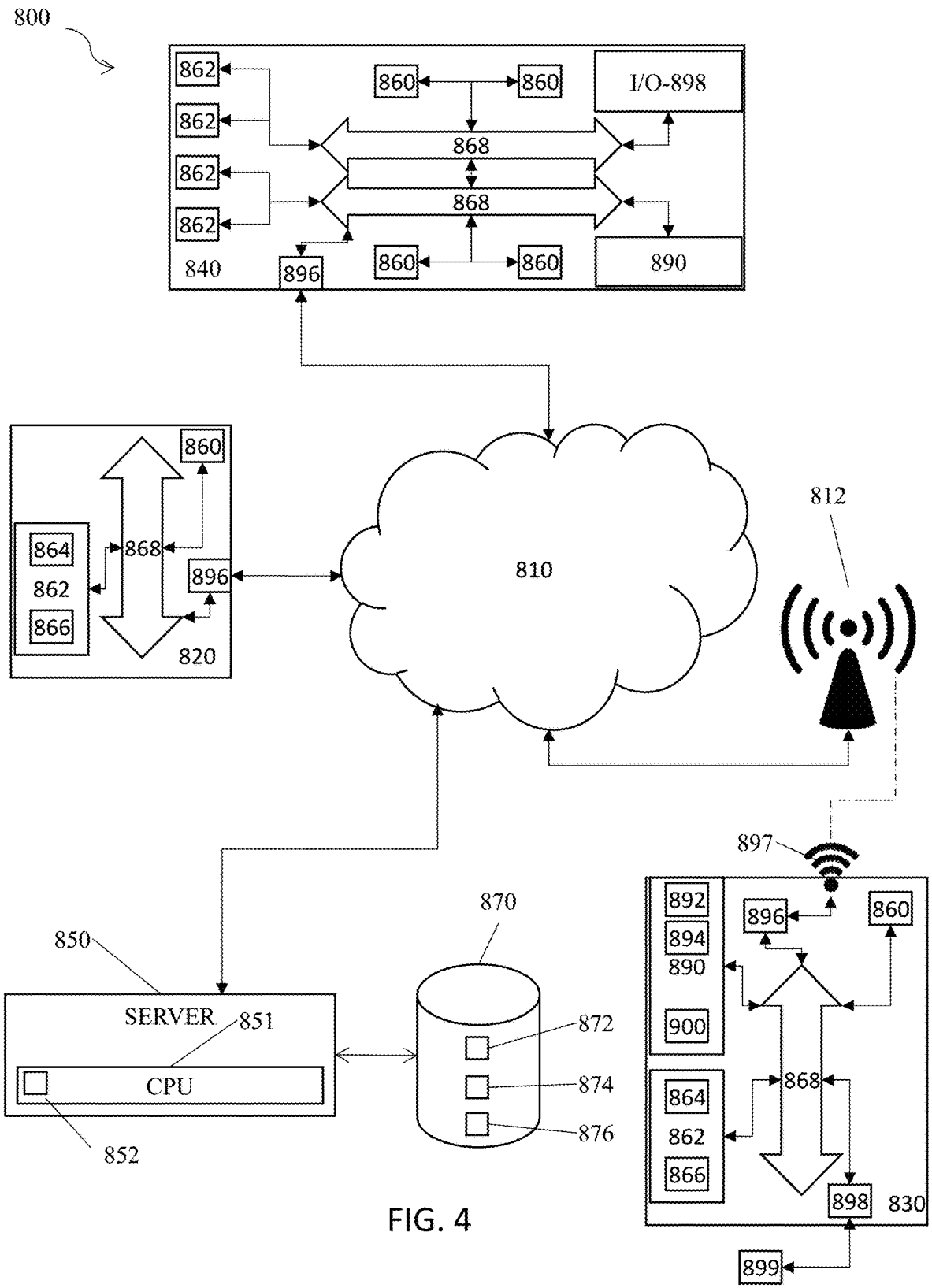
FIG. 4 is a schematic diagram of a cloud-based system of the present invention.

FIG. 4 is a schematic diagram of an embodiment of the invention illustrating a computer system, generally described as 800, having a network 810, a plurality of edge devices 820, 830, 840, a server 850, and a database 870.

The server 850 is constructed, configured, and coupled to enable communication over a network 810 with a plurality of edge devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a cloud-based network 810 for distributed communication via a wireless communication antenna 812 and processing by at least one edge device 830. Alternatively, wireless and wired communication and connectivity between edge devices and components described herein include wireless network communication such as Wi-Fi, WORLDWIDE INTEROPERABILITY FOR MICROWAVE ACCESS (WIMAX), Radio Frequency (RF) communication including RF identification (RFID), NEAR FIELD COMMUNICATION (NFC), Bluetooth™ including Bluetooth™ LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the edge devices 820, 830, 840. In certain aspects, the computer system 800 is operable to be implemented using hardware or a combination of software and hardware, either in a dedicated computing device, or integrated into another entity, or distributed across multiple entities or edge devices.

By way of example, and not limitation, the edge devices 820, 830, 840 are intended to represent various forms of digital computers 820, 840, 850 and mobile devices 830, such as a server, blade server, mainframe, mobile phone, personal digital assistant (PDA), smartphone, desktop computer, netbook computer, tablet computer, workstation, laptop, and other similar edge devices. The components shown here, their connections and relationships, and their functions, are meant to be exemplary only, and are not meant to limit implementations of the invention described and/or claimed in this document.

In one embodiment, the edge device 820 includes components such as a processor 860, a system memory 862 having a random access memory (RAM) 864 and a read-only memory (ROM) 866, and a system bus 868 that couples the memory 862 to the processor 860. In another embodiment, the edge device 830 additionally includes components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other edge devices 899, including, but not limited to, alphanumeric input devices, mice, electronic styluses, display units, touch screens, signal generation devices (e.g., speakers), or printers.

By way of example, and not limitation, the processor 860 is a general-purpose microprocessor (e.g., a central processing unit (CPU)), a graphic processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or translated logic, discrete hardware components, or any other suitable entity or combinations thereof that is operable to perform calculations, process instructions for execution, and/or other manipulations of information.

In another embodiment, shown as 840 in FIG. 4, multiple processors 860 and/or multiple buses 868 are used, as appropriate, along with multiple memories 862 of multiple types (e.g., a combination of DSP and a microprocessor, a plurality of microprocessors, one or more microprocessors in conjunction with a DSP core). Also, multiple edge devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote edge devices 820, 830, 840, 850 through a network 810. An edge device 830 is operable to connect to a network 810 through a network interface unit 896 connected to a bus 868. Edge devices are operable to communicate communication media through wired networks, direct-wired connects or wirelessly, such as acoustic, RF, or infrared, through an antenna 897 in communication with the network antenna 812 and the network interface unit 896, which includes digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium includes the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which includes a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that is operable to be used to store the computer readable instructions and which is operable to be accessed by the computer system 800.

It is also contemplated that the computer system 800 may not include all of the components shown in FIG. 4, includes other components that are not explicitly shown in FIG. 4, or is operable to utilize an architecture completely different than that shown in FIG. 4. The various illustrative logical blocks, modules, elements, circuits, and algorithms described in connection with the embodiments disclosed herein is operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. All modifications and improvements have been deleted herein for the sake of conciseness and readability but are properly within the scope of the present invention.

The invention claimed is:

1. A system for locating server nodes in close proximity to edge devices using georouting, comprising:
at least one cloud platform in network communication with at least one edge device;
wherein the at least one cloud platform includes a cloud platform domain name system (DNS) service, at least one cloud platform application programing interface (API), at least one cloud platform router, and a cloud platform storage component;
wherein the at least one cloud platform is in network communication with a plurality of server nodes, wherein information associated with each of the plurality of server nodes is stored in a node database on the at least one cloud platform;
wherein the at least one cloud platform router is operable to access the node database;
wherein the cloud platform DNS service is operable to receive a DNS query from the at least one edge device;
wherein the cloud platform DNS service returns an API address corresponding to the DNS query;
wherein the at least one cloud platform API is operable to connect to the at least one edge device using the API address;
wherein the at least one cloud platform is operable to receive a second query request from the at least one edge device, wherein the second query request includes geolocation data for the at least one edge device;
wherein the at least one cloud platform API is operable to receive the second query request, wherein the at least one cloud platform API sends the second query request to the at least one cloud platform router;
wherein the at least one cloud platform router is operable to return a nearest server node from the plurality of server nodes to the at least one cloud platform API based on the second query request;
wherein the at least one cloud platform API returns a second query response to the at least one edge device using a hypertext transfer protocol (HTTP) redirect, wherein the HTTP redirect includes a unique hostname; and
wherein the cloud platform DNS service is operable to resolve the unique hostname.

2. The system of claim 1, wherein the unique hostname is a combination of a node identifier (ID) associated with the nearest node and an application ID, wherein the application ID is received in the DNS query.

3. The system of claim 1, wherein the cloud platform DNS service resolves the unique hostname using a current Internet Protocol (IP) address received from the at least one edge device.

4. The system of claim 1, wherein the HTTP redirect includes a HTTP 307 Temporary redirect.

5. The system of claim 1, wherein the geolocation data is appended to the second query request as a query parameter for a Uniform Resource Identifier (URI).

6. The system of claim 1, wherein the at least one cloud platform further includes a cloud platform ledger, wherein the cloud platform ledger is operable to interact with at least one cloud platform smart contract.

7. The system of claim 1, wherein each of the plurality of server nodes includes an Internet Protocol version 6 (IPv6) address, a node ID, a cloud platform executor, and a plurality of v8 isolates.

8. The system of claim 1, wherein each of the plurality of server nodes is registered with a cloud platform global registry of the at least one cloud platform, wherein each of the plurality of server nodes is registered by issuing a HTTP POST request to a global service address corresponding to the at least one cloud platform.

9. The system of claim 1, wherein each of the plurality of server nodes includes a globally unique identifier (GLAD) that is generated when each of the plurality of server nodes is first powered on.

10. The system of claim 1, wherein the at least one cloud platform API is a Representational State Transfer (REST) interface.

11. The system of claim 1, wherein the geolocation data from the at least one edge device is a set of Global Positioning System (GPS) coordinates.

12. A method for locating server nodes in close proximity to edge devices using georouting, comprising:
providing at least one cloud platform in network communication with at least one edge device and a plurality of server nodes, wherein the at least one cloud platform includes a cloud platform domain name system (DNS) service, at least one cloud platform application programing interface (API), at least one cloud platform router, and a cloud platform storage component, wherein information associated with each of the plurality of server nodes is stored in a node database on the at least one cloud platform;

the at least one cloud platform router accessing the node database;

the cloud platform DNS service receiving a DNS query from the at least one edge device;

the cloud platform DNS service returning an API address corresponding to the DNS query;

the at least one cloud platform API is connecting to the at least one edge device using the API address;

the at least one cloud platform receiving a second query request from the at least one edge device, wherein the second query request includes geolocation data for the at least one edge device;

the at least one cloud platform API receiving the second query request, wherein the at least one cloud platform API sends the second query request to the at least one cloud platform router;

the at least one cloud platform router returning a nearest server node from the plurality of server nodes to the at least one cloud platform API based on the second query request;

the at least one cloud platform API returning a second query response to the at least one edge device using a hypertext transfer protocol (HTTP) redirect, wherein the HTTP redirect includes a unique hostname; and the cloud platform DNS service resolving the unique hostname.

13. The method of claim 12, wherein the unique hostname is a combination of a node identifier (ID) associated with the nearest node and an application ID, wherein the application ID is received in the DNS query.

14. The method of claim 12, wherein the cloud platform DNS service resolving the unique hostname uses a current Internet Protocol (IP) address received from the at least one edge device.

15. The method of claim 12, wherein the HTTP redirect includes a HTTP 307 Temporary redirect.

16. The method of claim 12, further including appending the geolocation data to the second query request as a query parameter for a Uniform Resource Identifier (URI).

17. The method of claim 12, wherein the at least one cloud platform further includes a cloud platform ledger, wherein the cloud platform ledger is operable to interact with at least one cloud platform smart contract.

18. The method of claim 12, wherein each of the plurality of server nodes includes an Internet Protocol version 6 (IPv6) address, a node ID, a cloud platform executor, and a plurality of v8 isolates.

19. The method of claim 12, wherein each of the plurality of server nodes includes a globally unique identifier (GUID) that is generated when each of the plurality of server nodes is first powered on.

20. A system for locating server nodes in close proximity to edge devices using georouting, comprising:

at least one cloud platform in network communication with at least one edge device;

wherein the at least one cloud platform includes a cloud platform domain name system (DNS) service, at least one cloud platform application programing interface (API), a cloud platform scheduler, at least one cloud platform router, a cloud platform database, and a cloud platform storage component;

wherein the at least one cloud platform is in network communication with a plurality of server nodes, wherein information associated with each of the plurality of server nodes is stored in a node database on the at least one cloud platform;

wherein the at least one cloud platform router is operable to access the node database;

wherein the cloud platform DNS service is operable to receive a DNS query from the at least one edge device;

wherein the cloud platform DNS service returns an API address corresponding to the DNS query;

wherein the at least one cloud platform API is operable to connect to the at least one edge device using the API address;

wherein the at least one cloud platform is operable to receive a second query request from the at least one edge device, wherein the second query request includes geolocation data for the at least one edge device;

wherein the at least one cloud platform API is operable to receive the second query request, wherein the at least one cloud platform API sends the second query request to the at least one cloud platform router;

wherein the at least one cloud platform router is operable to return a nearest server node from the plurality of server nodes to the at least one cloud platform API based on the second query request;

wherein the at least one cloud platform API returns a second query response to the at least one edge device using a hypertext transfer protocol (HTTP) redirect, wherein the HTTP redirect includes a unique hostname; and wherein the cloud platform DNS service is operable to resolve the unique hostname.

* * * * *